(12) United States Patent
Mezei et al.

(10) Patent No.: US 6,416,390 B1
(45) Date of Patent: Jul. 9, 2002

(54) METHODS AND APPARATUS FOR SANDBLASTING FIBER OPTIC SUBSTRATES

(75) Inventors: George A. Mezei, Fountain Valley; Rick Lockwood, Garden Grove, both of CA (US)

(73) Assignee: Poly-Optical Products, Inc., Santa Ana, CA (US)

( * ) Notice: Subject to any disclaimer, the term of this patent is extended or adjusted under 35 U.S.C. 154(b) by 6 days.

(21) Appl. No.: 09/756,396

(22) Filed: Jan. 8, 2001

(51) Int. Cl.[7] .................................................. B24B 1/00
(52) U.S. Cl. ............................ 451/37; 451/37; 451/75; 451/78; 451/83; 451/91
(58) Field of Search ............................ 451/37, 75, 78, 451/83, 91

(56) References Cited

U.S. PATENT DOCUMENTS 5,312,570 A * 5/1994 Halter ......................... 264/1.5
5,499,912 A * 3/1996 Mezei ......................... 425/363

* cited by examiner

*Primary Examiner*—Joseph J. Hail, III
*Assistant Examiner*—Shantese McDonald
(74) *Attorney, Agent, or Firm*—Renner, Otto, Boisselle & Sklar, LLP

(57) ABSTRACT

Methods and apparatus for marring a surface of a fiber optic substrate by sandblasting one or more sides of the substrate during movement of the substrate past one or more sandblasting nozzles to produce a specific illumination pattern. The nozzles may be operated intermittently to produce intermittent light emitting areas along the length of the substrate. Alternatively, the substrate may be moved past the nozzles at a variable speed, or the pressure of the nozzles or spacing of the nozzles from the surface of the substrate may be regulated during movement of the substrate past the nozzles in order to produce a specific illumination pattern. Also, a perforated plate may be placed between the nozzles and substrate in order to produce a specific illumination pattern. After the sandblasting operation, the substrate may be cleaned and cut to desired lengths, and permanently heat formed into any desired shape.

19 Claims, 2 Drawing Sheets

METHODS AND APPARATUS FOR SANDBLASTING FIBER OPTIC SUBSTRATES

FIELD OF THE INVENTION

This invention relates to methods and apparatus for sandblasting fiber optic substrates to create fiber optic illuminating devices.

BACKGROUND OF THE INVENTION

Fiber optic substrates, including both plastic optical fiber filaments and other shaped bodies, can be made into illuminators by marring, piercing or abrading (hereafter collectively referred to as "marring") the surface of the substrates at various points along their length to cause a portion of the light applied to one or both ends of the substrates to be emitted from the marred and/or unmarred surface areas. Such substrates may be marred to create a specific illumination pattern and can be used, for instance, for ornamental lighting, display lighting, front lighting, splash lighting and/or back-lighting.

Increased surface marring results in increased light emission. Accordingly, the intensity of the light emitted along the length of the substrates can also be varied by varying the amount of surface marring.

It is generally known to mar fiber optic substrates by stamping, machining, molding or rolling the substrates to create a desired illumination pattern on the surface of the substrates. Also, it is generally known to blast the surface of substrates with sand, grit or beads (hereafter collectively referred to as sandblasting) to cause light to be emitted.

Sandblasting has the advantage of being a less expensive way of producing side-lighting substrates than other previously known methods. However, there is a need for better control of the sandblasting process in order to be able to create specific illumination patterns.

SUMMARY OF THE INVENTION

The present invention relates to various methods and apparatus for sandblasting the surface of fiber optic substrates to produce relatively inexpensive side-lighting products having a specific illumination pattern.

In accordance with the invention, the fiber optic substrates are pushed or pulled through a sandblasting machine having one or more sandblasting nozzles oriented to blast one or more sides of the substrates as the substrates pass through the machine. The sandblasting nozzles may be oriented perpendicular to the direction of movement of the substrates through the sandblasting machine or angled in any direction as desired.

In one invention embodiment, the sandblasting nozzles are intermittently operated to create intermittent light emitting areas along the length of the substrates as desired. In another invention embodiment, the substrates are passed through the sandblasting machine at a variable speed to produce a desired light output pattern, for instance, to produce even side-lighting.

In another invention embodiment, the speed of the substrates passing through the sandblasting machine is constant but the pressure of the blaster nozzles is regulated to vary the depth of penetration and/or number of abrasions of the marring to produce a desired light output pattern, for instance, even side-lighting.

In another invention embodiment, the speed of the substrates passing through the sandblasting machine and rate of operation and pressure of the blaster nozzles is constant but the distance between the blaster nozzles and the substrates is regulated in order to produce a desired light output pattern, for instance, even side-lighting.

In another invention embodiment, a relatively thin perforated plate is placed between the blaster nozzles and the substrates in order to produce a desired light output pattern, for instance, text, symbols, nomenclature or picture side-lighting.

In another invention embodiment, the substrates are washed or cleaned as they exit the sandblasting machine. Also, the sandblasted substrates are cut to any desired length.

In another invention embodiment, the sandblasted substrates are heat formed permanently into a desired shape, as a secondary operation. Also, other secondary operations such as light source attachment and/or reflective surface operations may be performed on the substrates as desired.

In another invention embodiment, where the fiber optic substrates are initially coiled, if straight side-lighting substrates are desired, the substrates may be passed through a heated chamber and then cooled to produce straight substrates.

These and other objects, advantages, features and aspects of the invention will become apparent as the following description proceeds.

To the accomplishment of the foregoing and related ends, the invention, then, comprises the features hereinafter more fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE INVENTION

Marring the surface of plastic or glass optical fibers on one or more sides by sandblasting, grit blasting or bead blasting (hereafter collectively sandblasting) will result in side-lighting.

Fiber optic rods and thicker plastic plates can also be marred by sandblasting similarly to optical fibers. Light sources may be applied to one or both ends of the rods or along. one or several edges of the plates. However, if fiber optic substrates are sandblasted uniformly, the amount of light emitted along their length will be greater near the light source and less further away from the light source. Therefore, if uniform lighting is desired, there is a need to mar such fiber optic substrates unevenly (i.e., more aggressively away from the light source(s) and less aggressively near the light source(s)).

Figure 1:
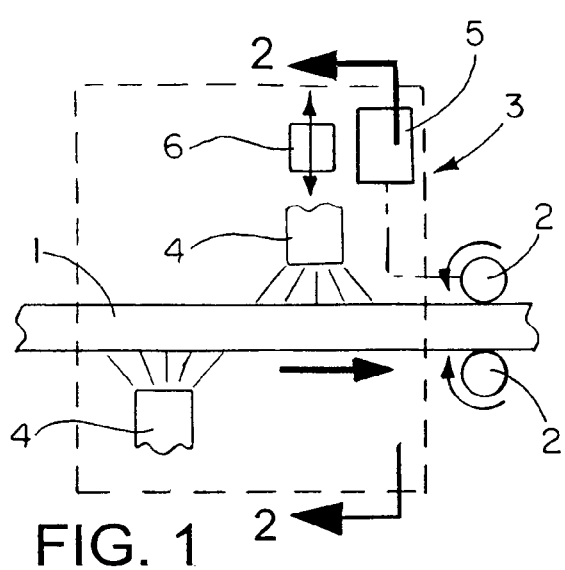
FIG. 1 is a schematic illustration of one embodiment of the present invention in which a fiber optic rod substrate is passed through a sandblasting machine.
Figure 2:
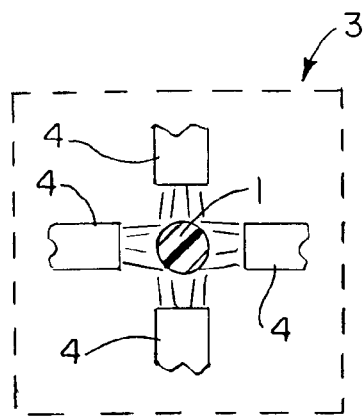
FIG. 2 is a transverse section through the machine of FIG. 1 as seen from the plane of the line 2—2 thereof showing sandblasting nozzles on all four sides of the substrate.
Figure 3:
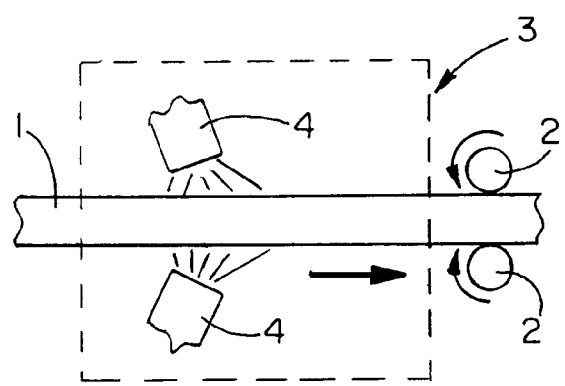
FIG. 3 is a schematic illustration of another invention embodiment which is similar to FIG. 1 except that the sandblasting nozzles are angled relative to the direction of movement of the fiber optic substrate passing through the machine rather than perpendicular to the direction of movement as shown in FIGS. 1 and 2.
Figure 6:
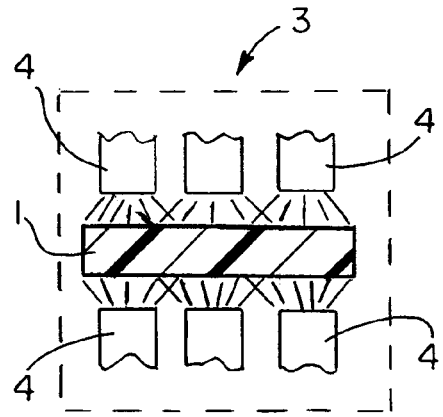
FIG. 6 is a transverse section through another invention embodiment which is similar to the invention embodiment shown in FIG. 5 except that a plurality of sandblasting nozzles are shown extending across the width of the fiber optic panel or plate rather than a single rectangular nozzle as shown in FIG. 5.
Figure 4:
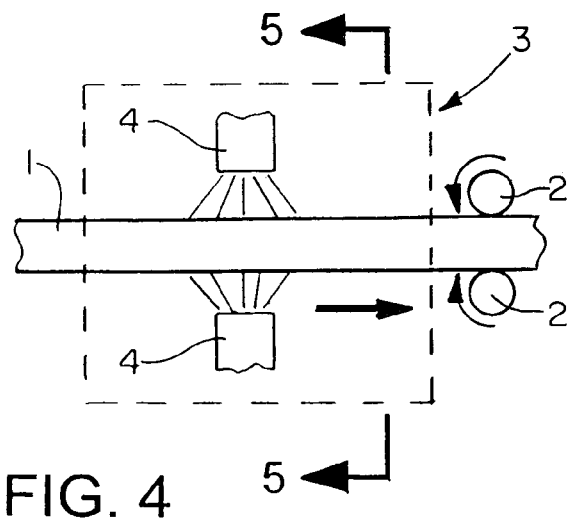
FIG. 4 is a schematic illustration of another invention embodiment which is similar to the invention embodiments previously shown except that the substrate is a fiber optic panel or plastic plate instead of a rod.
Figure 5:
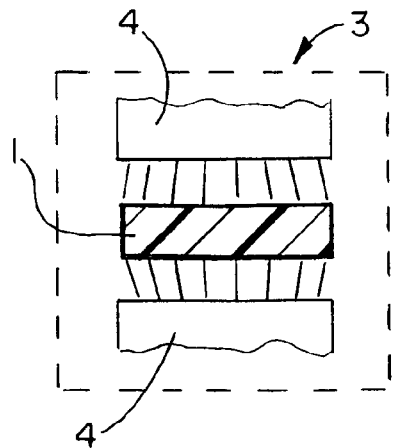
FIG. 5 is a transverse section through the machine of FIG. 4 as seen from the plane of the line 5—5 thereof.

FIGS. 1 and 2 show an invention embodiment in which a fiber optic substrate 1 is being pulled by rollers 2 through a sandblasting machine 3. Within the machine are one or more sandblasting nozzles 4 oriented to mar one or more sides of the substrate 1 by blasting the sides as the substrate passes through the machine. The sandblasting nozzles 4 may be oriented perpendicular to the direction of movement of the substrate 1 through the sandblasting machine as shown in FIGS. 1 and 2 or angled at less than 90 degrees in any direction as shown in FIG. 3 as desired.

Where the substrate 1 is a relatively wide plate, the sandblasting nozzles 4 may be rectangular and extend substantially the full width of the plate as schematically shown in FIGS. 4 and 5. Alternatively, a plurality of nozzles 4 may be placed next to each other across substantially the full width of the plate as schematically shown in FIG. 6.

In order to produce a specific illumination pattern, for instance, intermittent light emitting areas along the length of the substrate 1, the sandblasting nozzles 4 may be intermittently operated by a computer/controller 5 (schematically shown in FIG. 1) as the substrate travels through the sandblasting machine 3 at a constant speed. Alternatively, the controller 5 may cause the substrate 1 to pass through the sandblasting machine 3 at a variable speed, in order to produce a desired illumination pattern, for instance, even side-lighting, by proportionately reducing the substrate traveling speed through the machine as the distance from the end(s) of the substrate to be lighted increases.

In another invention embodiment, the traveling speed of the substrate 1 through the machine 3 may be constant, but the pressure of the sandblasting nozzles 4 may be regulated by the controller 5 to be more or less intense, in order to produce a specific illumination pattern. For instance, the pressure of the sandblasters 4 may be regulated to be more intense as the longitudinal distance between the sandblasters and the end(s) of the substrate to be lighted increases in order to produce even side-lighting.

In another invention embodiment, the spacing of the sandblasting nozzles 4 from the surface of the substrate 1 can be regulated by the controller 5 as the substrate travels through the sandblasting machine in order to produce a desired illumination pattern. For instance, the sandblasting nozzles 4 may be progressively moved further away from the substrate 1 by a computer controlled actuator 6 (see FIG. 1) as the longitudinal distance between the nozzles and the end(s) of the substrate to be lighted decreases during passage of the substrate through the sandblasting machine in order to produce even side-lighting.

Figure 7:
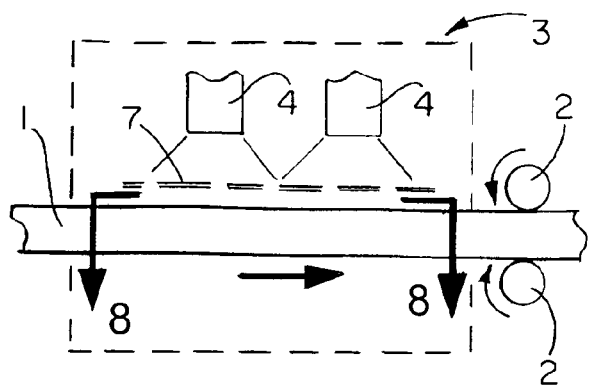
FIG. 7 is a schematic illustration of another invention embodiment in which a perforated plate is placed between the sandblasting nozzles and substrate in order to produce a specific illumination pattern such as nomenclature or picture side-lighting.
Figure 8:
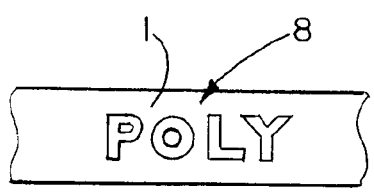
FIG. 8 is a top plan view of the fiber optic substrate of FIG. 7 as seen from the plane of the line 8—8 thereof to show an example of a specific illumination pattern formed on the surface of the substrate.

In another invention embodiment shown in FIGS. 7 and 8, a relatively thin perforated plate 7 may be placed between the sandblasting nozzle(s) 4 and substrate 1 in order to produce a specific illumination pattern, for example, nomenclature or picture side-lighting 8 (see FIG. 8). During the actual sandblasting operation, relative movement between the substrate 1 and perforated plate 7 is interrupted until the specific illumination pattern is produced.

Figure 9:
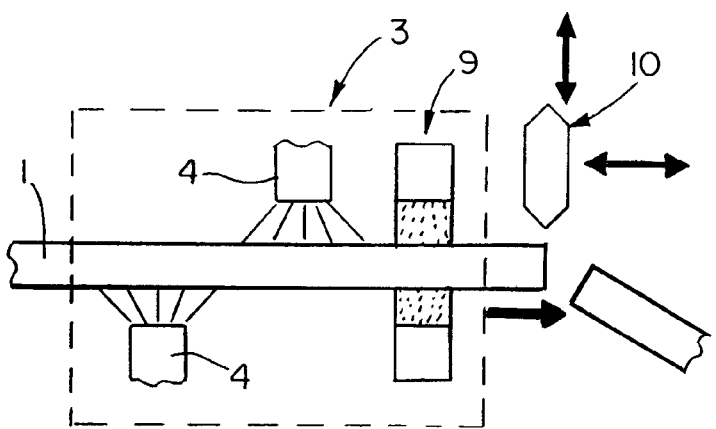
FIG. 9 is a schematic illustration of another invention embodiment in which a washing or cleaning device is shown near the exit of the sandblasting machine, and a cutting device is placed downstream of the cleaning device in order to cut the substrate to desired lengths.

A washing or cleaning device 9 may be attached to the sandblasting machine 3 near the exit of the machine in order to clean the sandblasted substrate 1 as schematically shown in FIG. 9. Also, a cutting device 10 may be placed downstream of the cleaning device 9 in order to cut the marred substrate into side-lighting substrate products of any desired length.

Figure 12:
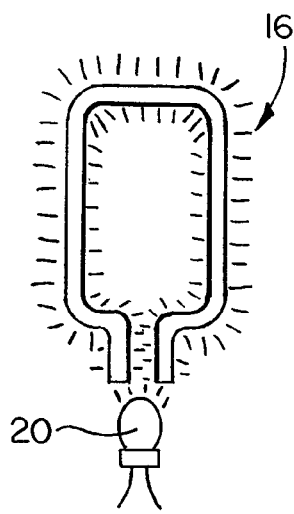
FIG. 12 is a schematic illustration of another side-lighting substrate product made in accordance with the present invention which has been heat formed permanently into a rectangular or other shape with straight sides, as a secondary operation.
Figure 10:
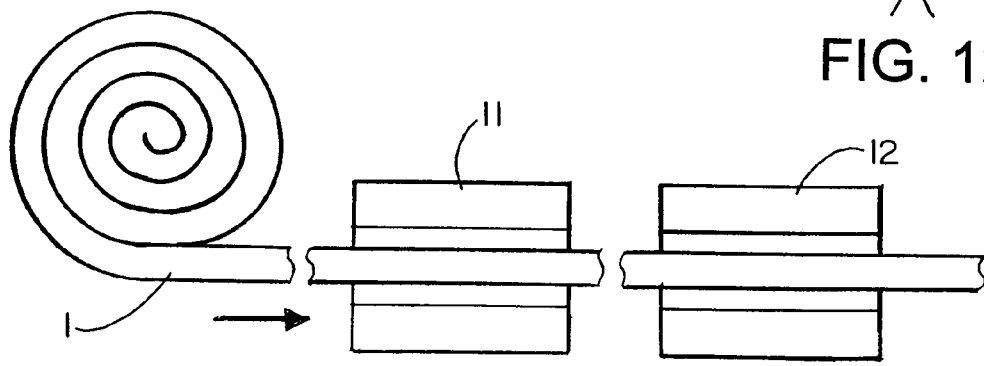
FIG. 10 is a schematic illustration of another invention embodiment in which a coiled substrate is passed through a heating chamber as it is uncoiled and then cooled before passing the substrate through a sandblasting machine in order to produce straight side-lighting substrate product.
Figure 11:
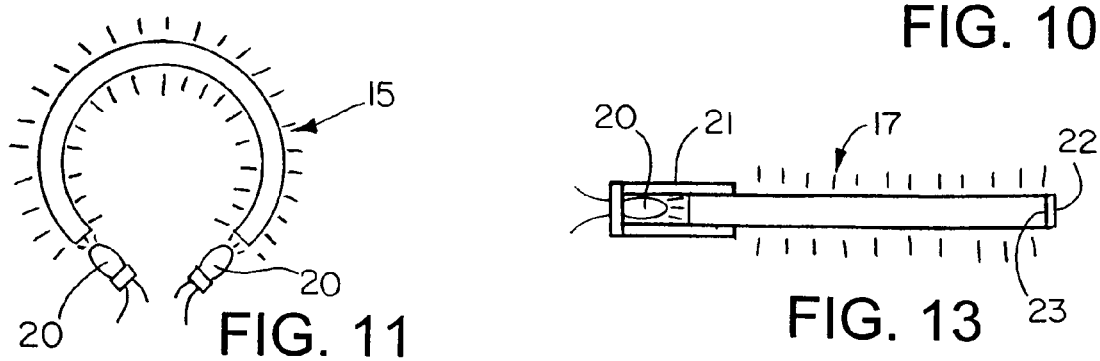
FIG. 11 is a schematic illustration of a side-lighting substrate product made in accordance with the present invention which has been heat formed permanently into an annular shape as a secondary operation.

If the optical fiber substrate material is initially coiled, and straight side-lighting substrate product is desired, the substrate 1 may be passed through a heating chamber 11 as it is uncoiled and then cooled by passing the substrate through a cooling chamber 12 as schematically shown in FIG. 10 before passing the substrate through a sandblasting machine. Also, if desired, sandblasted substrates may be heat formed permanently into any desired shape, for instance, an annular shape side-lighting substrate product 15 as schematically shown in FIG. 11 or a rectangular or other shape side-lighting substrate product 16 with straight sides as schematically shown in FIG. 12, as a secondary operation, as desired. Any radii formed in the substrate product 16 should be at least 15 times the diameter of the substrate in order to minimize the loss of light at the radii.

Other secondary operations, such as light source attachment and/or reflective surface operations may also be performed as desired. For example, a suitable light source 20 such as a light emitting diode (LED) may be attached to one or both ends of a side-lighting substrate product 17 using shrink tubing 21 as schematically shown in FIG. 13, or gluing the light source 20 to one or both ends of the substrate product 16, 17 as schematically shown in FIGS. 11 and 12.

Figure 13:
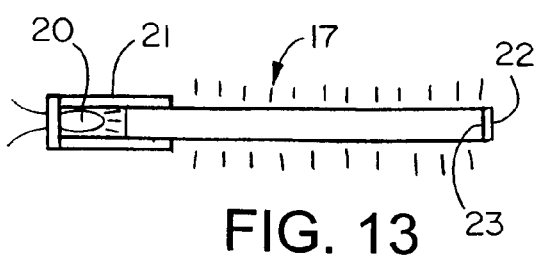
FIG. 13 is a schematic illustration of another side-lighting substrate product made in accordance with the present invention showing a light source attached to one end and reflective sheet or paint applied to the other end.

If the side-lighting substrate product is an optical fiber or rod less than 2 feet long, or a fiber optic plate less than 6 inches long, placing one or more light sources 20 at one end may provide enough light output if reflective sheet or paint 22 is applied to the other end as schematically shown in FIG. 13. Any suitable reflective material 22 may be applied to the reflective surface 23 of the substrate product, for instance, white or silver paint or white or silver adhesive foil.

Although the invention has been shown and described with respect to certain embodiments, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein illustrated exemplary embodiments of the invention. Also, all of the disclosed functions may be computerized and automated as desired. In addition, while a particular feature of the invention may have been disclosed with respect to only one of several embodiments, such feature may be combined with one or more other features of the other embodiments as may be desired and advantageous for any given or particular application.

What is claimed is:

1. A method of marring a surface of a fiber optic substrate to produce a specific illumination pattern for causing light entering one or more ends or sides of the substrate to be emitted by the pattern comprising the steps of moving the substrate past a sandblasting nozzle oriented toward the surface of the substrate, and controlling the operation of the nozzle to blast the surface of the substrate to produce a specific illumination pattern.

2. The method of claim 1 wherein a plurality of sandblasting nozzles are oriented toward different sides of the substrate for sandblasting different sides to produce a specific illumination pattern.

3. The method of claim 1 wherein the nozzle is oriented perpendicular to the direction of movement of the substrate past the nozzle.

4. The method of claim 1 wherein the nozzle is oriented at various angles to the direction of movement of the substrate past the nozzle.

5. The method of claim 1 wherein the nozzle is intermittently operated during movement of the substrate past the nozzle to produce intermittent light emitting areas along the length of the substrate.

6. The method of claim 1 wherein the substrate is moved past the nozzle at a variable speed while the surface of the substrate is continuously sandblasted to produce a specific illumination pattern.

7. The method of claim 1 wherein the sandblasting pressure of the nozzle is regulated to be more or less intense during movement of the substrate past the nozzle in order to produce a specific illumination pattern.

8. The method of claim 7 wherein the sandblasting pressure of the nozzle is made more intense as the distance between the nozzle and the end of the substrate to be lighted increases in order to produce a specific illumination pattern.

9. The method of claim 1 wherein the distance between the nozzle and the surface of the substrate is varied during movement of the substrate past the nozzle in order to produce a specific illumination pattern.

10. The method of claim 9 wherein the distance between the nozzle and the substrate is increased progressively further away from the substrate in order to produce a specific illumination pattern.

11. The method of claim 1 wherein a perforated plate is positioned between the nozzle and substrate during sandblasting of the substrate by the nozzle in order to produce a specific illumination pattern.

12. The method of claim 1 further comprising the step of cleaning the substrate subsequent to the sandblasting step.

13. The method of claim 12 further comprising the step of cutting the substrate into desired lengths after the cleaning step.

14. The method of claim 1 wherein the substrate is uncoiled, heated and then cooled to straighten the substrate prior to or after the sandblasting step.

15. A method of making a fiber optic illuminating device comprising the steps of moving a fiber optic substrate past a sandblasting nozzle oriented toward a surface of the substrate, controlling the operation of the nozzle to sandblast the surface of the substrate to produce a specific illumination pattern for causing light entering at least one end or side of the substrate to be emitted by the pattern, and cutting the substrate to desired lengths.

16. The method of claim 15 further comprising the step of permanently heat forming the cut lengths of substrate into desired shapes.

17. The method of claim 15 further comprising the step of attaching a light source to at least one end or side of the cut to length substrate.

18. The method of claim 17 further comprising the step of applying a reflective material to the other end or side of the cut lengths of substrate.

19. Apparatus for marring a surface of fiber optic substrate to produce a specific illumination pattern for causing light entering one or both ends or sides of the substrate to be emitted by the pattern comprising a sandblasting nozzle, means for moving the substrate past the nozzle, and control means for controlling the operation of the nozzle to sandblast the surface of the substrate to produce a specific illumination pattern.

* * * * *